Figure 1:
Figure 1:
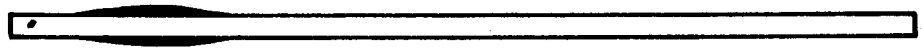
Figure 1:

RISTOCETIN A — $R_f = 0.4$

RISTOCETIN B — $R_f = 0.16$

RISTOCETINS A & B — $R_f$'s = 0.39 & 0.15

United States Patent Office 3,006,813
Patented Oct. 31, 1961

3,006,813
ANTIBIOTIC
Julian E. Philip, Lake Forest, and Jay R. Schenck, Waukegan, Ill., assignors to Abbott Laboratories, North Chicago, Ill., a corporation of Illinois
Filed Nov. 21, 1956, Ser. No. 623,589
3 Claims. (Cl. 167—65)

This invention relates to a novel crystalline antibiotic substance and more particularly to a new crystalline ristocetin B antibiotic and to the method of preparation thereof.

It has heretofore been found that the microorganism *Nocardia lurida* NRRL 2430 produces during its growth in deep culture fermentation media a substance designated generically as ristocetin which is a useful therapeutic agent having properties not possessed by other previously described antibiotic agents. In the ristocetin fermentation media two very closely related ristocetins are produced and which have been designated as ristocetin A, and ristocetin B, each of which can be isolated in a distinct crystalline form. A method of fermenting the above antibiotics is disclosed in the co-pending application for United States Letters Patent by Goldstein et al., Serial No. 373,692, filed August 11, 1953, now abandoned.

It is an object of the present invention to provide ristocetin B in a crystalline form substantially free of impurities and to a method of producing same.

Other objects of the present invention will be apparent from the detailed description and claims to follow.

The foregoing objects of the present invention are readily achieved by preferably aerobically growing in a deep culture fermentation media the microorganism *Nocardia lurida* NRRL 2430 or other ristocetin-B-producing strain of the said *Nocardia lurida* organism which are obtained by routine isolation and strain modification methods including selection of culture organism, and exposure of the organism to modifying means, such as X-ray, ultraviolet light, and chemical agents, and thereafter recovering the said ristocetin B as a solid crystalline material in the herein described manner.

The microorganism *Nocardia lurida* NRRL 2430, used herein for producing ristocetin B, was isolated from a soil sample collected from the Garden of the Gods, Colorado Springs, Colorado. The isolation was carried out by standard dilution procedures employing a solid medium, Baltimore Biological Laboratories trypticase soy agar, in Petri dishes. Structurally and functionally, this organism is found in the soil as a member of Nocardia genus according to the classification in Bergey's Manual of Determinative Bacteriology (6th Edition).

A careful study of the morphology and physiology of the species *N. lurida* NRRL 2430 show it to be distinctly different from any known species of microorganism. According to the scheme of identification of the Nocardia species in Bergey's Manual of Determinative Bacteriology (6th Edition), the Nocardia species are divided into two general groups. Group I is described as "partially acid-fast organisms with strongly refractive cells; non-proteolytic and generally non-diastatic; constantly capable of utilizing paraffin." *Nocardia lurida* NRRL 2430 is proteolytic both in litmus milk and gelatin and is not acid-fast, which distinguishes it from the Group I species. Group II is described as "non acid-fast organisms with weakly refractive cells; no distinct formation of cocci; and constantly diastatic." *Nocardia lurida* NRRL 2430 is not diastatic and therefore is distinguishable from the Group II species. None of the 33 Nocardia species described in Bergey's Manual has the family of characteristics corresponding to those of *Nocardia lurida*.

The *Nocardia lurida* species NRRL 2430 used in the present invention is further distinguished over other known species of Nocardia by the several physical, cultural, and physiological characteristics set forth as follows:

When grown on the Upjohn tryptone dextrin agar having the following composition:

| | Percent |
|---|---|
| Tryptone | 0.5 |
| Dextrin | 1.0 |
| Agar | 2.0 |
| Tap water, q.s. | 100.0 | moderate growth is observed with the Nocardia colonies having a 1 mm. diameter after four days' growth, 2 mm. diameter after seven days' growth, and 3 mm. diameter after eleven days' growth. The colonies formed are circular in configuration becoming slightly irregular, are shiny with a glassy appearance becoming heavily crinkled and honey gold or light gold colored (2ic), bamboo or chamois colored (2gc), substratal mycelium, cream white arerial mycelium forming around the edges of the colony, with scant cream aerial mycelium in the more heavily growing areas. The color code references used herein aret in accordance with "Color Harmony Manual" (3rd Edition), Jacobsen, Robert; Granville, Walter C.; Foss, Carl E.; 1948 Container Corporation of America.

When examined microscopically the mycelium of *Nocardia lurida* NRRL 2430 is observed to grow moderately dense and has a monopodial type branching structure. Early in growth it is non-septate. However, segmentation of the mycelium begins in 48 hours and complete fragmentation has taken place in 72 to 96 hours. The fragments or oidio-spores are rod-shaped with well-defined square ends. They measure approximately 0.8 to 1.5 microns in length. The mycelium measures approximately 0.5 micron in width. Single loop and double loop coils are observed in the mycelium as the culture ages when grown for microscopic observation. Conidia are not observed. The organism is not acid-fast when stained by conventional techniques.

The ability of the microorganism *Nocardia lurida* NRRL 2430 producing the antibiotic of the present invention to utilize various sources of carbon is indicated in the following table:

TABLE I

*Utilization of carbon*

| | Carbon Source | Utilization | Rate of Growth |
|---|---|---|---|
| Pentoses | Xylose | + | Moderate. |
| | Arabinose | + | Do. |
| | Rhamnose | − | |
| Hexoses | Dextrose | + | Do. |
| | Galactose | + | Do. |
| | Mannose | + | Do. |
| Ketoses | Fructose | + | Do. |
| | Sorbose | − | |
| Di-Saccharides | Sucrose | − | |
| | Lactose | − | |
| | Maltose | − | |
| | Cellibiose | + | Rapid. |
| Tri-Saccharide | Raffinose | − | |
| Poly-Saccharide | Soluble Starch | − | |
| | Cellulose | − | |
| Glucoside | Salicin | + | Slow. |
| Alcohols | Glycerol | + | Moderate. |
| | Mannitol | + | Rapid. |
| | Dulcitol | − | |
| | Inositol | − | |
| | Sorbitol | − | |
| Acids | Sodium Citrate | + | Slow. |
| | Sodium Lactate | + | Do. |
| | Sodium Succinate | + | Do. |
| | Sodium Acetate | + | Moderate. |
| | Sodium Potassium Tartrate | − | |
| Hydrocarbon | Paraffin | + | Do. |
| | Control (no carbon source added) | − | |

It should be understood that the above tests for utilization of energy sources are carried out under special growth conditions and that the failure of the actinomycete to utilize certain energy sources under the test conditions [1] does not preclude their utilization under different conditions.

The new crystalline antibiotic ristocetin B is prepared by growing the *Nocardia lurida* strain NRRL 2430 in a variety of cultural media, since as is apparent from the above-described carbon utilization tests, the said organism is capable of utilizing many energy sources. However, for economy of producing maximum yields of the antibiotic and ease of isolation, certain culture media are preferable. Thus, the presently preferred sources of carbohydrates in the culture medium are sugars, such as dextrose, fructose and cellibiose, or other carbohydrate substances, such as sugar alcohols, including mannitol, glycerol, and lipids, such as vegetable and lard oil. One or more of the carbohydrate sources can be supplied by such natural products as molasses, corn syrup, or the like. The preferred nitrogen sources include a wide variety of substances of both animal and vegetable origin, such as soybean meal, meat extracts, corn steep liquor, distillers solubles and other sources including casein, amino acid mixtures, peptones, and the like. Inorganic nitrogen sources such as nitrates, nitrate salts or ammonium salts can also be employed.

The nutrient inorganic salts incorporated in the medium include the customary salts capable of yielding ions of sodium, potassium, calcium, phosphate and the chloride, sulfate, and the like.

As is necessary for the growth and development of other microorganisms, essential trace elements should also be included in the culture medium. Such trace elements are supplied as impurities incidental to the addition of the other constituents of the medium.

As heretofore specified, the preferred method of producing ristocetin B is by deep culture aerobic fermentation. However, for the preparation of limited amounts of ristocetin B, shake flask and surface culture bottles can be employed. In accordance with the usual procedure, it is desirable to first grow a vegetative inoculum of the *Nocardia lurida* organism and to transfer the active vegetative inoculum aseptically to the fermentation tanks. The medium in which the vegetable inoculum is produced can be the same or different from that used to produce the antibiotic.

The *Nocardia lurida* strain NRRL 2430 is grown in the fermentation process at a temperature of between about 22° C. to 28° C. The maximum yields of ristocetin B are presently obtained within about four days of fermentation although appreciable yields are produced even after prolonged periods of fermentation.

The rate of production of ristocetin B in the fermentation media is conveniently determined by the paper disc assay method described by T. H. Loo et al., J. Bacteriology, 50, 701 (1955). In assaying the fermentation media of the present invention, the clarified solution is placed upon the paper disc and the assay proceeds in the same manner as described in the above reference. It has been found desirable, however, in preparing the assay standard and the assay samples to employ a somewhat more concentrated solution of the antibiotic. Thus, the standard is preferably diluted in pH 6.0 phosphate buffer (1%) to 100 mcg./ml., 40 mcg./ml., 20 mcg./ml., and 10 mcg./ml. After the assay samples are plated, the plates are incubated overnight at 30° C. Thereafter, zone sizes are read in millimeters and the standard slope determined in the usual manner.

The presence of ristocetin B and any ristocetin A can be readily determined by paper chromatographic procedures in accordance with the usual ascending strip technique wherein strips are suspended in the developing (irrigating) solvent contained at the bottom of the cylinder, preferably after equilibrating the strips with the atmosphere of the cylinder. The strips were allowed to remain in the cylinder and develop for about 16 hours at a temperature of about 28° C. and thereafter dried and developed in the usual manner. The test organism for the bioautographs was *Bacillus subtilis* ATCC 10707 and the paper employed was a standard strip of Eaton-Dikeman #613. The solvent systems found particularly useful in differentiating the antibiotic ristocetin B from all other known antibiotics are: n-butanol saturated with deionized water, n-butanol saturated with deionized water and having 2.0% w./v. paratoluene sulfonic acid added to n-butanol rich layer, n-butanol saturated with deionized water having 2.0% w./v. paratoluene sulfonic acid and 2.0% piperidine v./v. added to the butanol rich layer, methylisobutyl ketone saturated with deionized water, and methanol 80 parts and deionized water 20 parts v./v. containing 1.5% sodium chloride w./v. and having the strips buffered with a solution containing .95 M sodium sulfate and .05 M sodium acid sulfate (NaHSO$_4$). It has been found that ristocetin B moves less rapidly than ristocetin A in the latter solvent system, and where there is a mixture of ristocetin B and ristocetin A, two clear longitudinally spaced zones appear in the bioautograph. Comparison of the position of the zone will establish which antibiotic is present. Under optimum conditions using a fresh solvent mixture consisting of the said 80 parts methanol and 20 parts water containing the specified salts, the Rf value of ristocetin B is about .16 and the Rf value of ristocetin A is about .40.

In the drawing, FIGURE 1 represents a bioautograph prepared from a paper chromatogram on which were simultaneously chromatographed ristocetin B, ristocetin A, and a mixture of ristocetin B and ristocetin A. The solvent used in accordance with the herein described standard technique was a freshly prepared solution of methanol 80 parts and deionized water 20 parts containing 1.5% sodium chloride w./v. with the strips buffered with a solution containing .95 molar sodium sulfate and .05 molar sodium acid sulfate. The areas indicated in black are zones where no growth of the bacterial test organism B. *subtilis* occurred.

The antibiotic ristocetin B produced by fermentation of a culture of *Nocardia lurida* NRRL 2430 is recovered from the fermentation medium by utilizing the adsorptive technique. Thus, the antibiotic ristocetin B is adsorbable from the clear solution thereof upon various surface active materials, such as carbon, ion exchange resins and cellulose. Useful results are produced by adsorbing the antibiotic on activated carbon, such as Darco G-60, and on other common commercial carbons. The clear filtrate, after the separation of adsorptive material, may be discarded and the carbon is washed with water to remove impurities. The adsorbed antibiotic activity free of the fermentation beer is then eluted batchwise by slurrying with an aqueous solution of a solvent selected from the group acetone, methanol, ethanol, isopropanol, tertiary butanol, and similar organic polar solvents, said solution being acidified with a dilute acid, such as sulfuric acid or acetic acid. The slurrying operation is preferably repeated several times and the final volume is approximately one-third that of the starting beer. The aqueous acetone eluate is concentrated to remove the acetone and the pH of the resulting aqueous solution is adjusted to between about pH 4.0 and 5.0. The potency of the ristocetin prior to the subsequent chromatography is generally between about 60 and 120 mcg./mg.

Carbon chromatographic purification and separation of ristocetin B from other antibiotics is preferably effected by passing an aqueous solution of the ristocetin B prepared in the above manner and having a pH of between pH 4.0 and 5.0 through a column comprised of activated carbon, such as Darco G-60, containing 6 grams carbon per 125,000 mcg. of activity as determined by the plate

---

[1] Pridham, T. G., and Gottlieb, D.: The Utility of Carbon Compounds by Some Actinomycetales as an Aid to Species Determination, J. Bacteriology 56, 107–114 (1948).

disc assay described above, admixed with an equal amount of a diatomaceous earth filter aid, such as Celite 545, to improve the flow rate. The activity is adsorbed on the column and the column is washed with water to remove extraneous, water-soluble unadsorbed material. Development of the activity through the column is then accomplished by the flow through the column of acidified aqueous acetone solutions having a gradually increased acetone concentration. It should be understood that a solution of any one of the other polar solvents specified herein, can be used in place of acetone. The acidity of each of the aqueous acetone solutions is produced by adding about 1 ml. of 6 N sulfuric acid per liter of the aqueous acetone solution. In several experiments the major proportion of the ristocetin B activity comes through the carbon column when the acetone concentration of the developing solutions is between about 16 and 32% acetone. The presence of ristocetin B is detected by paper strip chromatography (FIG. 2) and those solutions having an Rf in the range between about 0.10 to 0.20 under the conditions hereinafter to be described which specify using a freshly prepared development solution are combined and concentrated to give an antibiotic having a potency of about 600 units/mg.

Ristocetin B can be further purified by passing the latter aqueous solution of the said antibiotic having a potency of about 600–800 units/mg. through an acid-washed alumina column. The alumina column to which is applied the latter concentrated aqueous solution of ristocetin B (50% w./v.) is developed by first washing with a substantially water-free polar solvent, such as absolute methanol, followed immediately by eluting the ristocetin B activity with a polar solvent-water solution, such as a 50:50 water-methanol solution. The bulk of the ristocetin activity is obtained in the said solvent-water fractions which on concentrating and lyophilizing produces a ristocetin product having a potency of about 800–1200 units/mg.

The amorphous ristocetin B product obtained from the alumina column by treatment in the above manner is crystallized by dissolving a portion thereof in a water-alcohol solution, such as a water-ethanol solution, and centrifuging to separate an oil precipitate. Additional ethanol is added to the aqueous alcohol solution and further oily precipitation occurs which is removed by centrifuging. The saturated aqueous alcohol solution free of precipitated oil is allowed to stand at room temperature after scratching the tube until crystallization is complete.

The following specific examples are set forth solely for the purpose of illustrating the present invention and should not be construed to limit the invention to the precise ingredients and proportions specified.

EXAMPLE I

An agar slant of oatmeal agar is prepared by steaming 30 g. of rolled oats for 30 minutes in one liter of tap water after which the material is filtered through cheesecloth and 2% agar added to form a solid medium and is thereafter inoculated with a soil stock sample of the microorganism *Nocardia lurida* NRRL 2430 described by the co-pending application Serial No. 373,692, filed August 11, 1953. The slant is incubated at 28° C. for between four and seven days. Sterile distilled water is added to the slant and the surface growth removed by scraping with a sterile inoculating loop.

Standard 500 ml. Erlenmeyer flasks containing 125 ml. of the following medium:

| | |
|---|---|
| Rolled oats | g-- 20 |
| Dextrin | g-- 10 |
| Cerelose | g-- 5 |
| NaCl | g-- 5 |
| $CaCO_3$ | g-- 5 |
| $KH_2PO_4$ | g-- 1 |
| $NH_4NO_3$ | g-- 5 |
| Tap water | liters-- 1 | are sterilized at 121° C. for 30 minutes under steam pressure and are inoculated with the surface growth from the above sterile agar slant. The flasks are incubated on a rotary shaker machine operating at 240 r.p.m., 2.25 inch excentric radius at a temperature of 28° C. for a period of 48 hours. 4% by volume of the growth from the Erlenmeyer flasks is used to inoculate two additional flasks containing the same fermentation medium. These newly inoculated flasks are incubated for 48 hours at 28° C. under the same rotary conditions. At the end of the 48-hour growth period the inoculum is ready to be transferred to the production medium.

Thereafter, flasks containing the following growth medium:

| | |
|---|---|
| Cerelose | g-- 10 |
| Molasses | g-- 20 |
| Peptone | g-- 5 |
| Tap water | liters-- 1 | are inoculated with 4% by volume of the growth contained in the latter pair of Erlenmeyer flasks and are incubated in the same manner as the above-mentioned Erlenmeyer flasks. After four days of incubation on the rotary shaker machine, the growth is harvested and the pooled beer is used as a source of the new antibiotic substance of the present invention. Assays are carried out by the herein described paper disc assay method using *Bacillus subtilis* and which indicate on the average of at least about 40 units/ml.

A 30-liter fermenter containing a fermentation medium having the following compositions:

| | |
|---|---|
| Cerelose | g-- 10 |
| Molasses | g-- 20 |
| Peptone | g-- 5 |
| Tap water | liters-- 1 | which has been steam-sterilized at 121° C. for one hour is inoculated with 300 ml. (25% by volume) of the ristocetin-B-producing culture grown in the shaken flasks in the manner described above. The fermentation is carried out at 26° C. with an aeration rate of 0.8 liter of air per liter of medium per minute. Agitation is accomplished by means of a 4-bladed impeller, 8″ in diameter, which operates at 480 r.p.m. Lard oil containing 2.5% octadecanol is used to control foaming. The fermenters are harvested after four days and the beer when assayed by the herein described paper disc assay method shows yields of at least about 60 units/ml.

EXAMPLE II

The beer obtained by the fermentation process of Example I is harvested by adding to the whole beer, 2% wt./unit volume of a filter aid, such as Celite 545, and filtering the beer. The ristocetin in the clear beer is then adsorbed on activated carbon by adding to the clarified beer 10 g. Darco G-60 per liter of beer filtered. The ristocetin activity is eluted from the carbon with three portions of 40% aqueous acetone containing 4 ml. of 6 N sulfuric acid per liter of acetone solution. The total volume of eluate used is about 300 ml. per liter of starting beer.

The aqueous acetone eluate is concentrated to remove the acetone and the pH of the aqueous ristocetin solution is adjusted to about pH 5.0 and the clear ristocetin solution is introduced into a carbon chromatographic column. The potency of the ristocetin solution prior to the chromatography is generally about 200 units/mg. as determined by the *Bacillus subtilis* plate assay method.

The ristocetin aqueous solution is thus further purified by passing through a carbon chromatographic column comprising 6 g. of carbon and 6 g. of a filter aid, such as Celite 545, per gram of solids having a potency of 200 units/mg. antibiotic activity. The said carbon column is preferably prepared by mixing the carbon and Celite as a thick slurry in water containing a wetting agent, such as tergitol penetrant, pouring the slurry into a column and running water through the activated carbon under pressure prior to applying the aqueous antibiotic solution to the column. The column is washed with water and the ristocetin B activity developed with acidified aqueous acetone solutions containing gradually increased amounts of acetone. Each liter of the said aqueous acetone solutions contains about 1 ml. of 6 N sulfuric acid.

In the following Table II is shown the results of the carbon chromatogram in which a ristocetin aqueous solution containing 700 grams total solids and having a potency of approximately 200 units/mg. is applied to a carbon column having a diameter of 6 inches and containing 4350 grams of Darco G-60 and 3380 grams of Celite 545.

TABLE II

| Fractions | Volume (liter) | Dev. Soln., Percent Acetone | Million Units | Paper Strip Rf |
| --- | --- | --- | --- | --- |
| A | 95 | 0-8 | 0 | |
| B | 126 | 8 | 46.5 | 0.40 |
| C | 54 | 16 | 38.3 | 0.45 |
| D | 36 | 16 | 4.2 | 0.18 and 0.45 |
| E | 18 | 32 | 4.5 | 0.17 and 0.44 |
| F | 18 | 32 | 15.7 | 0.16 |
| G | 38 | 32 | 10.0 | 0.16 |

Fractions F and G containing ristocetin B are combined and further purified as in Example III.

EXAMPLE III

The ristocetin B product obtained by the process of Example II is further purified by chromatographing an aqueous solution of the said antibiotic through an acid-washed alumina column. The alumina column is prepared by slurrying alumina, such as Alorco alumina (Grade F20), in water and adding thereto sulfuric acid until a constant pH of 3.0 is attained. The alumina thus treated is washed with water to remove excess acid and is then washed with methanol and air dried.

In processing 6.0 g. of ristocetin B as recovered in Example II when dissolved in 10 ml. of water, the volume of acid-washed alumina used was 290 ml. Thereafter, the alumina column containing the ristocetin adsorbed thereon is developed by washing with 500 ml. of absolute methanol followed immediately by a 50:50 mixture of methanol-water.

Starting with 750,000 units of a solution having a potency of 830 units/mg. ristocetin B, the following 50 ml. fractions were collected:

| Fractions | Total Units | Potency (u./mg.) |
| --- | --- | --- |
| A | 0 | 0 |
| B | 74,000 | 985 |
| C | 144,000 | 1,690 |
| D | 124,000 | 1,170 |
| E | 100,000 | 1,000 |
| F | 88,000 | 1,120 |
| G | 66,000 | 1,060 |
| H | 25,000 | |
| J | 6,000 | |
| K | 0 | |
| | 627,000 | |

EXAMPLE IV

Crystalline ristocetin B sulfate is produced from the high potency fractions obtained from the alumina column of Example III. Thus, fractions C through G of the foregoing Example III are combined, concentrated to a small volume and lyophilized. The amorphous ristocetin B thus obtained (183 mg.) having a potency of about 1100 units per mg. as measured by *Bacillus subtilis* plate assay method is dissolved in 0.7 ml. water, and 1.75 ml. 95% ethanol is added and the solution warmed. Some precipitation occurs on cooling to room temperature. The oil is separated by centrifugation and 0.2 ml. ethanol is added with warming. Additional precipitation occurs and the oil is separated by centrifugation. The saturated solution is allowed to stand for a period of about two weeks at room temperature in a glass tube, the walls of which have been scratched, after which time crystallization is complete. The crystals of ristocetin B sulfate are further purified by filtering and washing with 70% ethanol followed by a methanol wash and drying.

Paper chromatography tests on a solution of crystalline ristocetin B sulfate obtained in the foregoing manner were carried out in 1000 ml. graduate cylinders by the ascending strip technique wherein strips were suspended in the developing (irrigating) solvent contained at the bottom of the cylinder by frictionally engaging the strip between the ground glass cylinder stopper and the neck portion of the cylinder. In some of the solvent systems employed, the strips were equilibrated with the atmosphere of the cylinder by allowing them to hang above the solvent surface for a period before being lowered into the solvent. All of the solvent systems were run in an air incubator maintained at 28° C. Immiscible solvent systems were allowed to separate at 28° C. The test organism for bioautographs was *Bacillus subtilis* ATCC 10707 and the paper employed was a standard strip of Eaton-Dikeman #613.

Solvent System I:
    n-Butanol saturated with deionized water.
    Equilibration—3 hours.
    Developing time—16 to 17 hours.
    Rf=0.

Solvent System II:
    n-Butanol saturated with deionized water. 2.0% w./v. paratoluene sulfonic acid added to n-butanol rich layer.
    Equilibration—3 hours.
    Developing time—16 to 17 hours.
    Rf=0–.05.

Solvent System III:
    n-Butanol saturated with deionized water. 2.0% w./v. paratoluene sulfonic acid and 2.0% piperidine v./v. added to the butanol rich layer.
    Equilibration—3 hours.
    Developing time—16 to 17 hours.
    Rf=0.

Solvent System IV:
    Methylisobutyl ketone saturated with deionized water.
    Equilibration—none.
    Developing time—3 hours.
    Rf=0.

Solvent System V:
    Methylisobutyl ketone saturated with water to which is added 2.0% paratoluene sulfonic acid w./v.
    Equilibration—none.
    Developing time—3 hours.
    Rf=0.

Solvent System VI:
    Methylisobutyl ketone saturated with deionized water plus 2% v./v. piperidine.
    Equilibration—none.
    Developing time—3 hours.
    Rf=0.

Solvent System VII:
    Deionized water saturated with methylisobutyl ketone.
    Equilibration—none.
    Developing time—3 hours.
    Rf=0–.05.

Solvent System VIII:
    Deionized water saturated with methylisobutyl ketone with 1.0% w./v. paratoluene sulfonic acid added.
    Equilibration—none.
    Developing time—3 hours.
    Rf=.68.

Solvent System IX:
  Deionized water saturated with methylisobutyl ketone to which is added 1.0% v./v. piperidine.
  Equilibration—none.
  Developing time—3 hours.
  Rf=.90.
Solvent System XI:
  Methanol 80 parts: deionized water 20 parts v./v. plus 1.5% NaCl w./v. added to the solution. Strips are buffered with a solution containing .95 M $Na_2SO_4$ and .05 M $NaHSO_4$.
  Equilibration—3 hours.
  Developing time—16 to 17 hours.
  Rf=.16.
Solvent System AA:
  Amyl acetate saturated with 0.1 M potassium phosphate buffer at 6.15. The buffer is made from $K_2HPO_4$ and $KH_2PO_4$ salts in deionized water.
  Equilibration—3 hours.
  Developing time—16–17 hours (solvent part goes to neck of cylinder and evaporates).
  Rf=0.
Solvent System MO:
  40 ml. n-butanol, 10 ml. methanol, 20 ml. deionized water. Mix together and add excess methyl orange (approximately 1.5 gms.) and let stand at 28° C. Separate from undissolved methyl orange.
  Equilibration—3 hours.
  Developing time—16 to 17 hours.
  Rf=.44.

Ristocetin B on chemical analysis is found to consist of the following elements: carbon, hydrogen, nitrogen, and oxygen. Several crystalline ristocetin B sulfate samples when prepared in accordance with the foregoing procedure, on chemical analysis were found to contain C, H, N, and S in the range of 52.9 to 53.5% carbon, 5.5 to 5.9% hydrogen, 5.6 to 6.6% nitrogen, and 1.3 to 1.5% sulfur. The latter sulfate salt can be readily converted to the chloride salt by passing a solution of the said sulfate over an anion exchange resin, such as Amberlite IR–4B in the chloride form. Other salts of ristocetin can be prepared by passing a solution thereof through a resin column of the foregoing type which has been regenerated by treatment with the appropriate anion. The phosphate and picrate salts of ristocetin B have also been prepared by precipitation from aqueous solution on addition of the acid thereto.

The infrared absorption spectra of the crystalline ristocetin B in a petroleum mineral oil (Nujol) mull, using a Perkins-Elmer Model 21 double beam infrared spectrometer, is shown in FIGURE 1 of the drawing. The Nujol mull of ristocetin B when adjusted to a concentration at which the broad absorption band at 9.4μ transmits 20%, exhibits the following absorption bands, the infrared spectrum between 2–15μ:

| | |
|---|---|
| 3.0μ | Broad (S). |
| 3.42μ | (Nujol). |
| 6.06μ | (M). |
| 6.28μ | (W). |
| 6.64μ | (M). |
| 6.84μ | (Nujol). |
| 7.28μ | (Nujol). |
| 7.6–7.8μ | Broad (W). |
| 8.25μ | (M). |
| 9.4μ | Broad (S). |
| 12.0–12.6μ | Broad (W). |
| 13.9μ | (Nujol). |

S=strong; M=medium; W=weak.

The crystalline ristocetin B gives a strongly positive test for carbohydrate with anthrone reagent and a strongly positive test for reducing sugars after dilute acid hydrolysis.

The biuret, Sakaguchi, and maltol tests on the crystalline ristocetin B were negative. The phosphomolybdic acid color test of Folin and Ciocalteu for phenols was positive for the ristocetin B and the ninhydrin tests were positive after acid hydrolysis.

Using a Tiselius electrophoresis apparatus, the electrophoretic mobility values for the crystalline ristocetin B are $4.4 \times 10^{-5}$ cm.²/sec. volt at pH 3 (phthalate buffer, $u=0.05$) and $7.4 \times 10^{-5}$ cm.²/sec. volt at pH 6.2 (phosphate buffer, $u=0.05$).

The isoelectric point of the crystalline ristocetin B is 8.1 for a glycine-sodium hydroxide buffer at an ionic strength of 0.05.

The diffusion constant for the crystalline ristocetin B is $1.18 \times 10^{-6}$ cm.²/sec.

Figure 2:
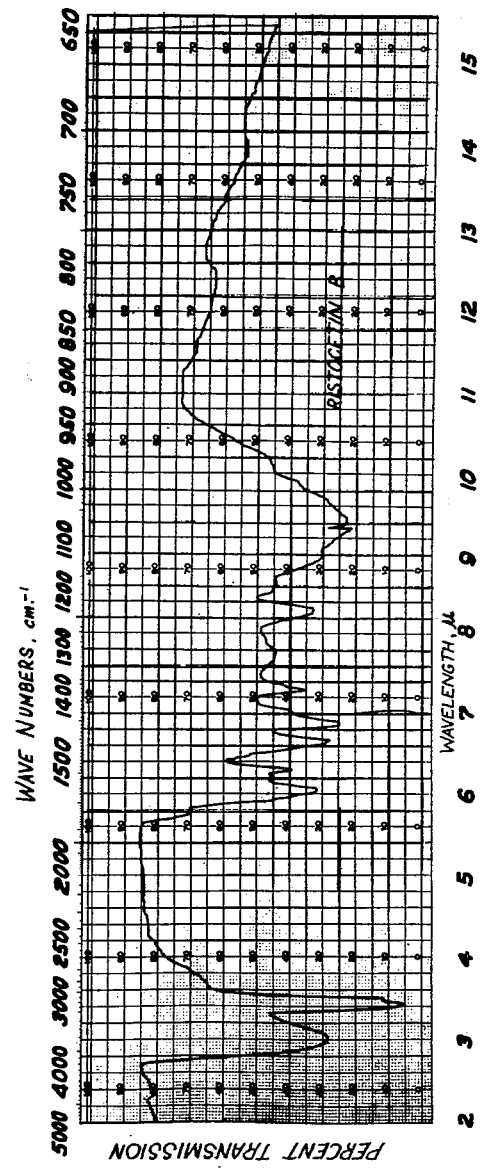

The ristocetin B crystals shown in FIGURE 2 of the drawing are birefringent and exhibit an average refractive index of 1.575.

Upon subjecting a crystalline ristocetin B sulfate (about 5 mcg.) solution to paper electrophoreses by immersing strips of paper (Whatman 0.3 mm.) about 10 inches in length in 0.034 M sodium phosphate buffer of pH 5.5 and pipetting about 5λ of a 1 mg./cc. solution of the crystalline ristocetin B onto the said strips followed by placing the strips between thick glass plates with the ends of the strips placed in the buffer which is bridged to a tenth normal potassium chloride solution through agar at room temperature, the ristocetin B moves 7.5 cm. when the system is subjected to 140 volts and 1.5–2.0 milliamps. for 22 hours across the electrodes placed in the potassium chloride solution. The said strips are incubated with Bacillus subtilis. Under identical electrophoretic conditions ristocetin A travels 13 cm. A clean separation of ristocetin B and ristocetin A is thus obtained when mixed in a single solution and subjected to the foregoing paper electrophoreses.

The antibiotic ristocetin B is very stable at neutral and acidic pH's and can be boiled in water at pH 2.5 for 30 minutes without destroying significantly the antibiotic activity thereof.

Crystalline ristocetin B sulfate obtained in the above manner is soluble in water, dilute acids, and dilute alkalis, but it is generally insoluble in most organic solvents including methyl alcohol, ethyl alcohol, ether, dioxane, chloroform, and glacial acetic acid.

Broth dilution assays using several strains of streptococci organisms to determine the minimum inhibitory concentrations of ristocetin B and ristocetin A show that the activity ratio of ristocetin B to ristocetin A is between about 3 to 4. Thus, the results of the broth dilution assay studies indicate that crystalline ristocetin B has a potency of between about 3000 to 4000 units per mg. compared with the standard crystalline ristocetin A potency of 1000 units per mg.

The antibiotic ristocetin B has been therapeutically effective on intravenous administration in humans against certain pathogenic organisms causing pneumonia, acute bronchitis, and enterococcal bacteremia. The antibiotic ristocetin B has been found to be bactericidal against many organisms, including pneumococci, streptococci, staphylococci, clostridia, corynebacteria, and mycobacteria, and many of the microorganisms against which it is effective, including staphylococci, do not readily develop strain resistance to the ristocetin because of the bactericidal action.

Others may readily adapt the invention for use under various conditions of service, by employing one or more of the novel features disclosed or equivalents thereof. As at present advised with respect to the apparent scope of our invention, we desire to claim the following subject matter.

We claim:
1. A method for the preparation of non-toxic, acid addition salts of ristocetin B which comprises the steps of (a) slurrying a filtered fermentation beer resulting from the deep culture, aerobic fermentation of the microorganism Nocardia lurida NRRL 2430 with an activated carbon to adsorb thereon the antibiotic activity present in the filtered beer, (b) filtering the slurry to separate the carbon and washing the carbon repeatedly with an acidified, aqueous, polar, organic solvent to free the adsorbed acid-addition salts therefrom, (c) removing the organic solvent from the combined washings by distillation and adjusting the pH of the resulting aqueous solution to about 5.0, (d) passing the aqueous solution of said acid-addition salts through a carbon chromatographic column packed with a composition comprising six grams each of carbon and diatomaceous earth per gram of solids present in said aqueous solution to adsorb the said acid-addition salts on the carbon, (e) washing the carbon column with water to remove extraneous, water-soluble, unadsorbed material, (f) thereafter washing the carbon column with an acidified, aqueous, polar, organic solvent and collecting fractions of eluate from the column and (g) concentrating the fractions having an Rf value of between about 0.10 to 0.20 on strips buffered with a solution containing 0.95 molar sodium sulfate and .05 molar sodium hydrogen sulfate when developed in a solvent system consisting of 80 parts methanol and 20 parts deionized water v./v. containing 1.5% sodium chloride w./v. to obtain the resulting acid-addition salt as a solid residue.

2. A method for the preparation of non-toxic, crystalline, acid addition salts of ristocetin B which comprises the steps of (a) slurrying a filtered fermentation beer resulting from the deep culture aerobic fermentation of the microorganism *Nocardia lurida* NRRL 2430 with an activated carbon to adsorb thereon the antibiotic activity present in the filtered beer, (b) filtering the slurry to separate the carbon and washing the carbon repeatedly with an acidified, aqueous, polar, organic solvent to free the adsorbed acid-addition salts therefrom, (c) removing the organic solvent from the combined washings by distillation and adjusting the pH of the resulting aqueous solution to about 5.0, (d) passing the aqueous solution of said acid-addition salts through a carbon chromatographic column packed with a composition comprising six grams each of carbon and diatomaceous earth per gram of solids present in said aqueous solution to adsorb the said acid-addition salts on the carbon, (e) washing the carbon column with water to remove extraneous, water-soluble, unadsorbed material, (f) thereafter washing the carbon column with an acidified, aqueous, polar, organic solvent and collecting fractions of eluate from the column, (g) concentrating the fractions having an Rf value of between about 0.10 to 0.20 on strips buffered with a solution containing 0.95 molar sodium sulfate and .05 molar sodium hydrogen sulfate when developed in a solvent system consisting of 80 parts methanol and 20 parts deionized water v./v. containing 1.5% sodium chloride w./v. until they contain 50% by weight volume of said acid-addition salt, (h) passing the concentrate through an alumina column prepared by slurrying alumina in water, adjusting the pH of the slurry to 3.0, washing the treated alumina successively with water and an alkanol and air drying, (i) washing the alumina column having adsorbed thereon the resulting acid-addition salt with a polar, organic solvent to remove organic impurities, (j) freeing the adsorbed acid-addition salt from the alumina by washing the alumina repeatedly with a solution containing equal parts by volume of water and a polar, organic solvent, (k) concentrating and lyophilizing the collected washings to obtain an amorphous, solid, acid-addition salt and (l) crystallizing the solid salt from an aqueous alcohol solution.

3. A method for the preparation of the crystalline sulfate of ristocetin B which comprises the steps of (a) slurrying a filtered fermentation beer resulting from the deep culture aerobic fermentation of the microorganism *Nocardia lurida* NRRL 2430 with an activated carbon to adsorb thereon the antibiotic activity present in the filtered beer, (b) filtering the slurry to separate the carbon and washing the carbon repeatedly with an aqueous acetone mixture containing 40% by volume of acetone and four milliliters of six normal sulfuric acid per liter of aqueous acetone mixture to free the adsorbed sulfates therefrom, (c) removing the acetone from the combined washings by distillation and adjusting the pH of the resulting aqueous solution to about 5.0, (d) passing the aqueous solution of said sulfates through a carbon chromatographic column packed with a composition comprising six grams each of carbon and diatomaceous earth per gram of solids present in said aqueous solution to adsorb the said sulfates on the carbon, (e) washing the carbon column with water to remove extraneous, water-soluble, unadsorbed material, (f) thereafter washing the carbon column with an aqueous acetone mixture containing 32% by volume of acetone and one milliliter of six normal sulfuric acid per liter of aqueous acetone mixture and collecting fractions of eluate from the column, (g) concentrating the fractions having an Rf value of between about 0.10 and 0.20 on strips buffered with a solution containing 0.95 molar sodium sulfate and .05 molar sodium hydrogen sulfate when developed in a solvent system consisting of 80 parts methanol and 20 parts deionized water v./v. containing 1.5% sodium chloride w./v. until they contain 50% by weight volume of sulfate, (h) passing the concentrate through an alumina column prepared by slurrying alumina in water, adjusting the pH of the slurry to 3.0, washing the treated alumina successively with water and methanol and air drying, (i) washing the alumina column having adsorbed thereon the resulting sulfate with absolute methanol to remove organic impurities, (j) freeing the adsorbed sulfate from the alumina by washing the alumina repeatedly with a mixture containing equal parts by volume of water and methanol, (k) concentrating and lyophilizing the collected washings to obtain the amorphous, solid sulfate and (l) crystallizing the solid sulfate from an aqueous ethanol solution.

References Cited in the file of this patent

Waksman et al.: "The Actinomycetes and Their Antibiotics," pub. 1953, pages 134, 135, 144, 145, 153, 173, 180, 202 and 218.

Abstracts of Paper Nos. 91 through 94 presented at the Antibiotics Symposium, Washington, D.C., October 17 through 19, 1956, 4 pages.

Goldstein et al.: German application Serial No. A-20923, printed December 1, 1955, 8 pp.

Raper and Thom: Articles in N.Y. Academy of Science Art. 60 No. 1, October 29, 1954, pp. 5 and 24.

Sneath: J. Gen. Microbiology, August 1957, pp. 184–200; page 185 is especially pertinent.

Phillip et al.: Antibiotics Annual 1956–1957, pp. 699–715.